US006803522B2

(12) United States Patent
Skakun

(10) Patent No.: US 6,803,522 B2
(45) Date of Patent: Oct. 12, 2004

(54) PAINT SHIELD FOR COVER PLATES FOR ELECTRICAL OUTLETS AND SWITCHES

(76) Inventor: Mark Skakun, 427 Shadow Oaks, Irvine, CA (US) 92618

( * ) Notice: Subject to any disclaimer, the term of this patent is extended or adjusted under 35 U.S.C. 154(b) by 0 days.

(21) Appl. No.: 10/260,372

(22) Filed: Sep. 26, 2002

(65) Prior Publication Data

US 2003/0056968 A1 Mar. 27, 2003

Related U.S. Application Data

(60) Provisional application No. 60/325,355, filed on Sep. 26, 2001.

(51) Int. Cl.[7] .................................................. H05K 5/03
(52) U.S. Cl. .......................... 174/66; 174/67; 174/51; 174/54; 174/50; 33/528; 33/DIG. 10; 220/241; 220/242
(58) Field of Search .............................. 174/66, 67, 50, 174/54, 51; 33/528, DIG. 10; 220/241, 242

(56) References Cited

U.S. PATENT DOCUMENTS 3,955,870 A * 5/1976 Wasserman ................ 439/144
D279,860 S * 7/1985 Schwalbe ..................... D8/14
4,586,765 A * 5/1986 Ban ........................... 439/142
D297,396 S * 8/1988 Schwalbe ..................... D8/14
5,063,872 A   11/1991 Maus et al.
5,285,014 A   2/1994 Gilchrist
5,965,846 A * 10/1999 Shotey et al. ................. 174/66
6,103,974 A * 8/2000 Erdfarb ........................ 174/66

FOREIGN PATENT DOCUMENTS

FR           2431963 A * 3/1980 ................ 294/68.1

* cited by examiner

Primary Examiner—Dean A. Reichard
Assistant Examiner—Anton B Harris
(74) Attorney, Agent, or Firm—Christensen O'Connor Johnson Kindness PLLC

(57) ABSTRACT

Each of the embodiments of the invention has a rim, a deck and a raised portion on the deck to accommodate switch levers and television cable connectors. The rim fits closely around the perimeter of a cover plate and switch or outlet being shielded. The deck is generally parallel to the surface of the cover. Adhesive is applied to areas of the under surface of the deck which overlie the relatively smooth end areas of the cover plate. The shield has flexibility allowing for deflection under finger pressure to bring the adhesives into contact with the cover plate to securely attach the shield to the cover plate.

14 Claims, 6 Drawing Sheets

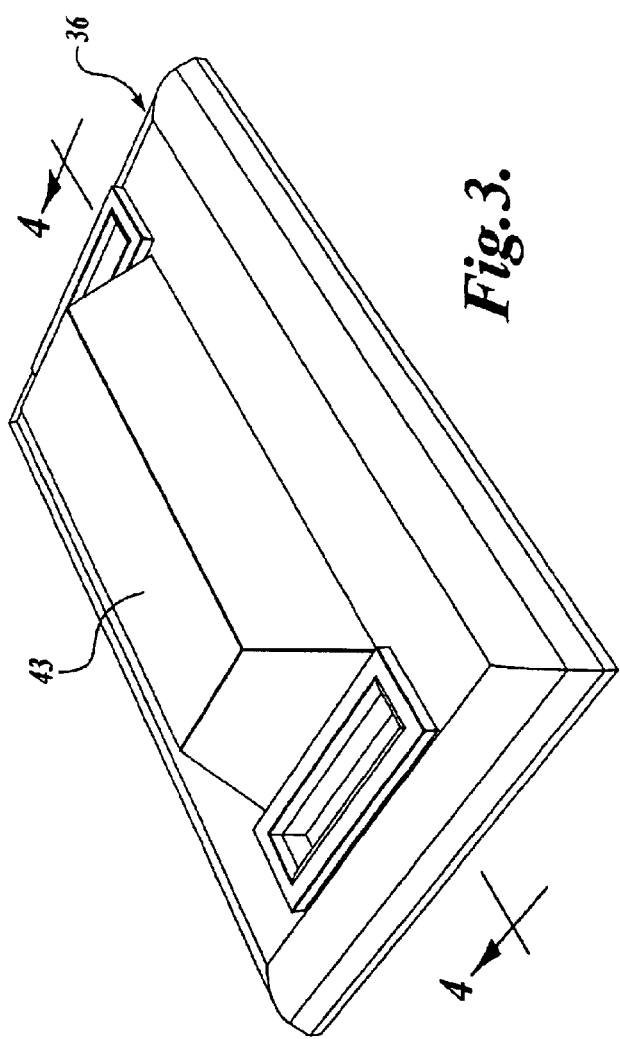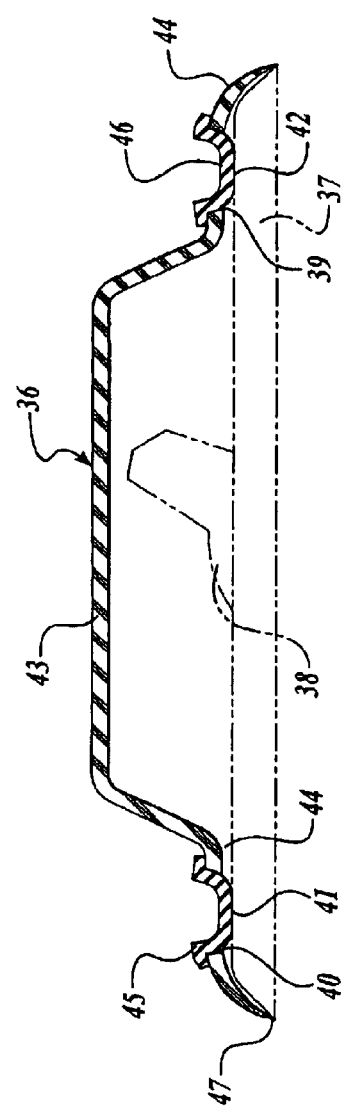

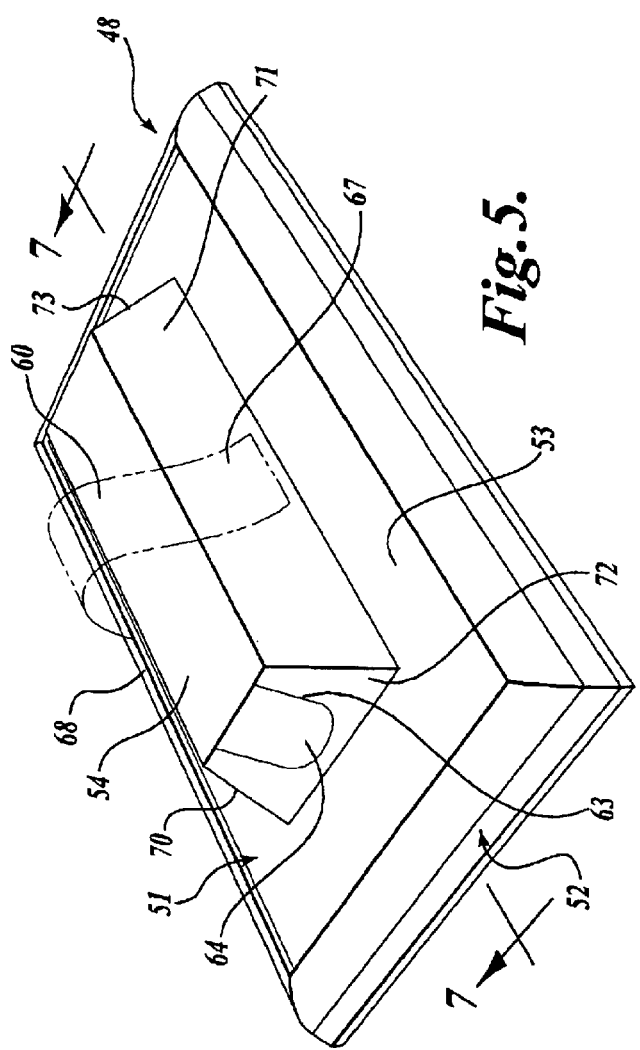
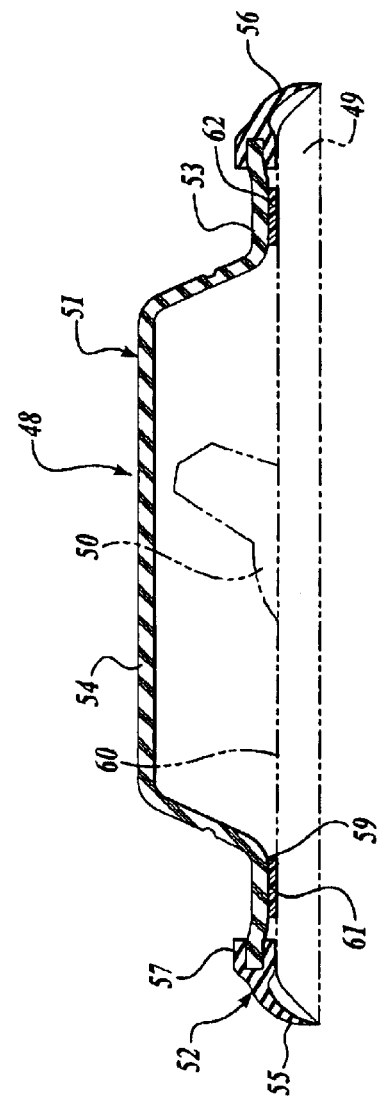

PAINT SHIELD FOR COVER PLATES FOR ELECTRICAL OUTLETS AND SWITCHES

CROSS-REFERENCE TO RELATED APPLICATION

This application is a continuation-in-part of prior U.S. Provisional Application No. 60/325,355, filed Sep. 26, 2001, and hereby claims the benefit of the filing date thereof under 35 U.S.C. §119.

FIELD OF THE INVENTION

The subject invention relates to methods and apparatus for masking or covering surfaces and articles to prevent paint from being applied to the surfaces and articles mounted on the surfaces. In particular, the invention relates to a paint shield used to prevent application of paint on plaques and cover plates for electrical and electronic outlets and switches.

BACKGROUND OF THE INVENTION

For purposes of this disclosure, the term cover plate(s) includes plaque(s). There is much prior art, patented and not, in this particular field. U.S. Pat. No. 5,285,014 discloses two embodiments of the patented inventions. The first is for cover plates and electrical outlets on which the cover plate is used. The second is for cover plates and electrical switches on which they are used. The first shield is secured in place by prongs simulating the prongs on an electrical plug engaged in one of the outlets being shielded along with the cover plate. The second embodiment is for use with electrical switches. It is deep enough to accommodate the switch lever and is held in place by a small suction cup located near one end of the shield. These products have never been successfully marketed and this is attributed to the fact that two embodiments are needed and that use of the small suction cup is not a reliable technique. Other devices are disclosed in U.S. Pat. Nos. 5,063,872 and Des. 279,860 and Des. 293,396. None of these devices has proven practicable as well.

SUMMARY OF THE INVENTION

The subject invention provides a paint shield suitable for use on both cover plates used with outlets and switches and has reliable means for attaching the shield to the cover plates. The shields of the present invention are also economical enough to manufacture to make them disposable after one or more usages. The cost per shield is less than the cost of removing and replacing a cover plate and exercising the extra care required to avoid applying paint to the exposed sockets and switches. The invention takes advantage of the fact that cover plates are standardized and manufactured to close dimensional tolerances. The shield of the present invention comprises an upper housing portion extending outwardly from a deck and a rim around the perimeter of the deck. The upper portion is shaped to accommodate a switch lever (one or more, as required), a television cable connector, or an electrical and electronic sockets. The rim fits snugly around the perimeter of the cover plate being shielded and contacts the surface on which the cover plate is mounted. The shield may be made of one or two primary pieces. If one piece, the piece is preferably thin, molded flexible plastic. The shield may be somewhat elastomeric so that the skirt may be slightly smaller than the perimeter of the cover plate and extend to fit it closely when installed. If made of two pieces, the upper portion and deck comprise one piece and the second piece is an elastomeric rim which snaps into place around the edges of the deck.

The shield is removably attached to the cover plate by an adhesive, either applied directly to portions of the inner surface of the deck or by pieces of preferably double-sided adhesive tape. The side applied to the shield has a greater adhesive capability than the side that contacts the cover plate to assure that the adhesive tapes, if used, are removed from the cover plate when the shield is removed. The upper housing portion may be specially shaped to allow the adhesive pieces or areas to be deflected easily onto the surface of the cover plate to accept adhesive attachment without deflection of the shield.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is an isometric view of a second embodiment of the invention shielding a cover plate;

FIG. 4 is a sectional view taken at section line 4—4 in FIG. 3;

FIG. 5 is an isometric view of a third embodiment of the invention shielding a cover plate;

FIG. 6 is a sectional view taken at section line 6—6 in FIG. 7;

DETAILED DESCRIPTION OF THE PREFERRED EMBODIMENT

Figure 1:
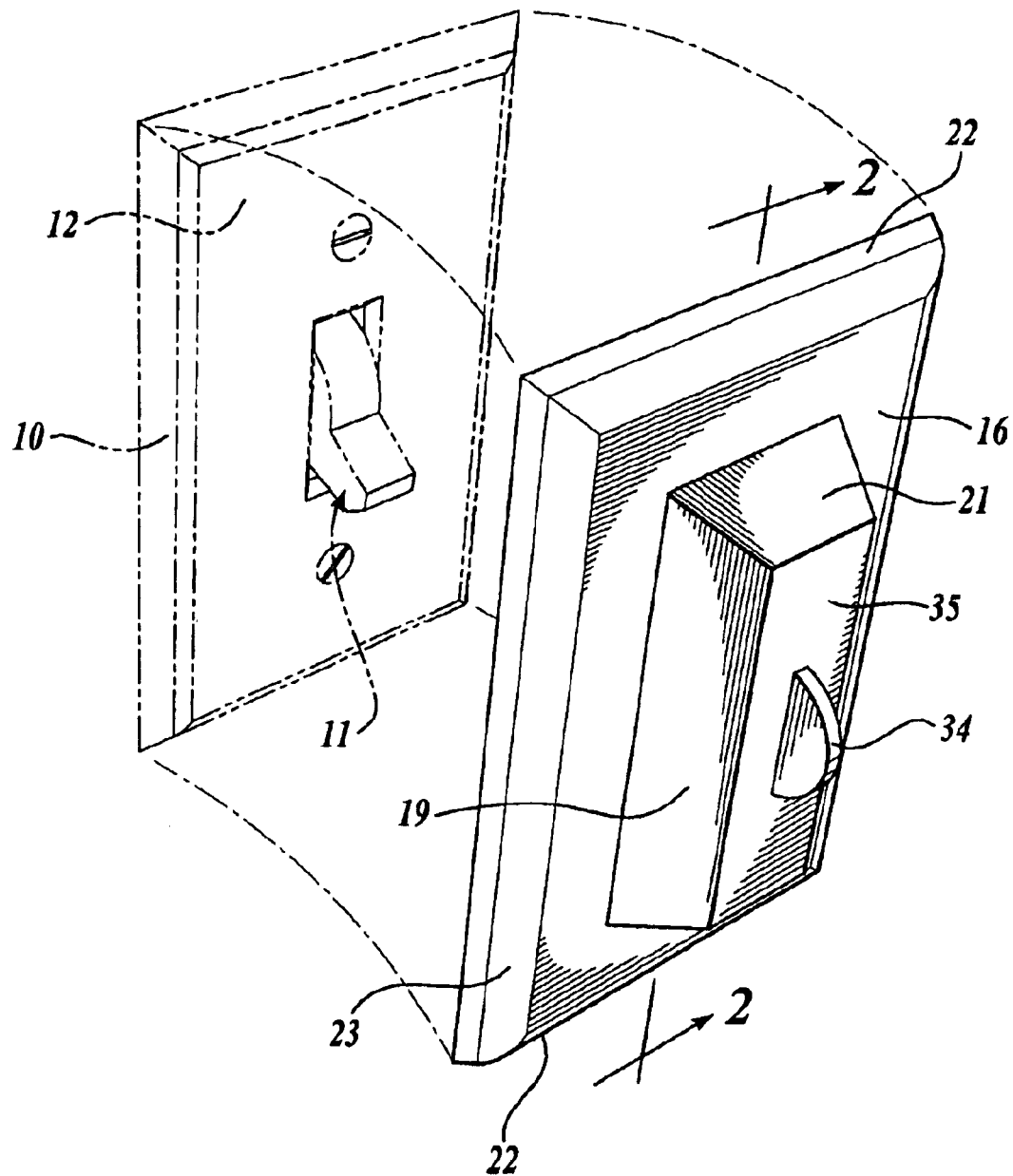
FIG. 1 is an exploded isometric view of a typical shield constructed in accordance with the present invention positioned to be installed over a switch and cover plate.

Referring to FIG. 1, a typical prior art cover plate 10 is installed over a switch assembly 11. The majority of cover plates are made in accurate standardized shapes and sizes. The broad rectangular surface 12 of most cover plates that surrounds the central switch opening is generally flat except for the downwardly curved peripheral edges 13. The broad surface 12 may also be slightly outwardly curved or there may be decorative designs molded into the cover plate. However, in all but a few instances, the surface 12 is sufficiently smooth (flat or curved) so that the present invention may be employed effectively as a paint shield.

Figure 2:
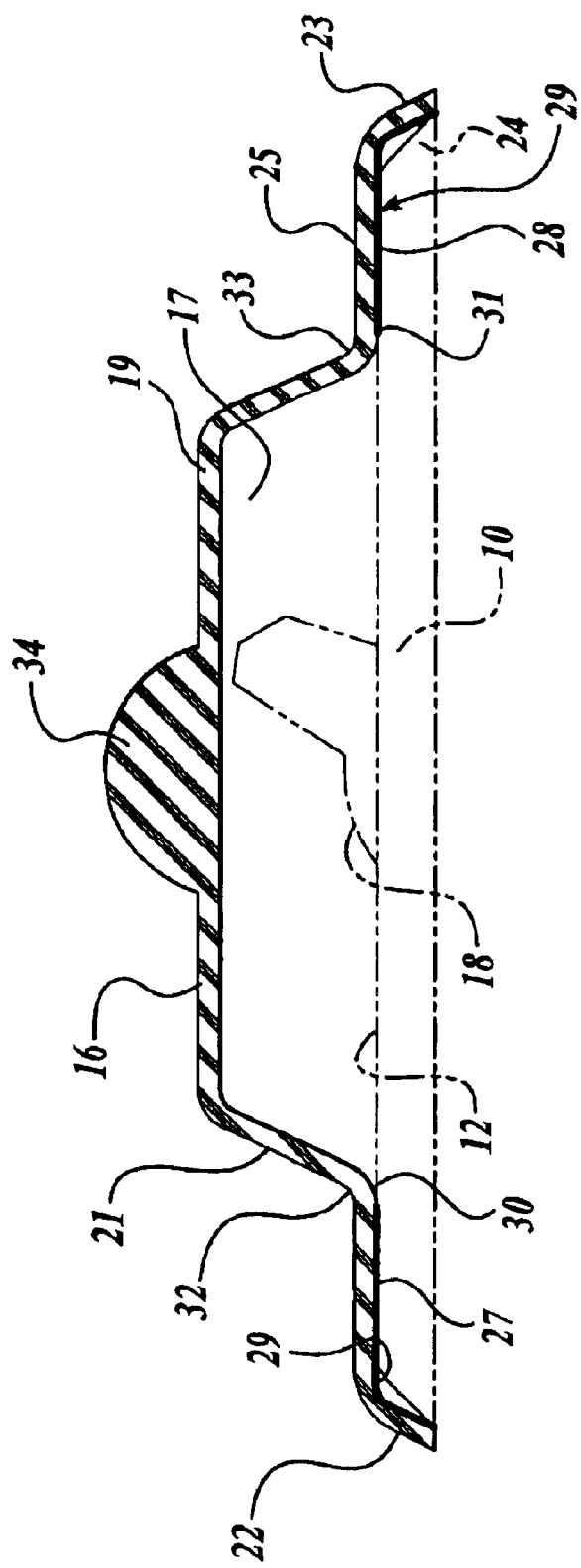
FIG. 2 is a longitudinal view of the shield of FIG. 1 taken along section line 1—1 showing the shield over a cover plate.

Referring to FIG. 2, a first embodiment of the subject shield 16 is installed over cover plate 10. The cover plate is attached to a switch lever 18. The shield 16 is generally rectangular in shape, with a flat deck 25 that covers the portion of the cover plate surrounding the switch 18. A central rectangular raised portion 19 extends outwardly from the central portion of the deck 25 and is long, high and deep enough to form a cavity 17 that fits over the switch lever 18 (FIG. 2) and/or over and around electrical outlets when the shield is installed over an outlet cover plate. Perimeter 23 of the shield extends outwardly from a rectangular edge 21 and curves to join the generally flat deck 25. The rectangular edge 21 contacts the surface of the wall (not shown) underlying the cover plate 10. The perimeter 23 of shield 16 fits snugly around perimeter 24 of cover plate 10. The flat deck 25 of the shield is constructed so that it is spaced a small distance d, in a range of five to 100 thousandths of an inch, above surface 12 of the cover plate 10. Patches 27 and 28 of self-stick adhesive are applied to inner surface 29 of the deck 25 adjacent the perimeter 23 and the inner surface of the perimeter 23. The adhesive is a releasable, water-based material available from 3M Company under the trade name of Fastbond Insulation Adhesive, Number 49. The adhesive is applied in a rectangular pattern spaced between the raised portion 19 and the perimeter 23. The inner edges 30 and 31 of the patches are preferably close to junctures 32 and 33 between the raised portion 19 and deck 25 of the shield. The adhesive preferably has greater holding power to the inner surface of the deck 25 than to the outer surface 12 of the cover plate 20 so that upon removal, all of the adhesive clearly separates from the cover plate.

The shield is preferably molded from a semi-rigid, but slightly pliable polymeric material so that the material will flex when pressed against the cover plate 10. A suitable plastic material is utility grade polyvinylchloride (pvc). The preferred thickness of the shield is 0.01 inch. In this embodiment, the perimeter 23, deck 25 and raised portion 19 are all integrally molded as a single piece. In use, the shield is installed on the cover plate 10 and finger pressure is applied to the deck 25 over the adhesive patches 27, 31 to deflect the shield so that the adhesive patches 27 and 28 contact the relatively smooth areas of the surface 12 of the cover plate 10 to hold the shield 16 in place. The shield is removed by grasping the raised portion, crushing it if necessary to get a grip on it and pulling it off the cover plate. Tab 34 may be formed in the top 35 of the shield to aid in removing it.

Referring to FIG. 3 and FIG. 4, a second embodiment of the invention includes a shield 36 positioned over a cover plate 37 for a switch assembly 38. This embodiment differs from that of FIG. 2 in that it is molded from a thicker material that is relatively stiff. The technique used to fasten this shield to the cover plate is also different. As shown in FIG. 4, two openings, 39 and 40, are provided on opposite ends of the deck of shield 36, one near each end of the cover plate in the deck portions 41 and 42 that are above and below the raised portion 43 of the shield 36. The openings are rectangular in shape and are positioned between the top and bottom of the raised portion 43 and the perimeter 44 of the shield 36. The members 45 and 46 are made of non-elastic, pliable material that is either inherently adhesive on one side or is treated to make it adherent. Flexible rectangular members 45 and 46 are positioned over the openings 39 and 40 and overlap the edges of the openings. The members 45 and 46 are depressed through the holes to contact the cover plate. The adhesive side of the pieces 45 and 46 face toward the outer surface of the deck so that the adhesive adheres to the perimeter of the holes 39 and 40. The central portions of the members are exposed through the openings 39 and 40 and are pressed downwardly onto the smooth surface of the cover plate underlying the openings, thus affixing the shield to the cover plate. In this embodiment, the shield may be relatively rigid, and thus, its perimeter edge 47 can be sharp.

Referring to FIG. 5 and FIG. 6, a third embodiment of the shield 48 is shown installed on cover plate 49 covering a switch 50. In this embodiment, the shield 48 comprises two parts 51 and 52. The first part 51 includes a deck 53 with a central raised portion 54. The second part 52 is a molded elastomeric rim. As shown in FIG. 6, part 52 is L-shaped with an outer arm having a knife-edged perimeter 55 that engages the wall outside the cover plate. The other arm of the rim extends over the edge of the cover plates and terminates in a bifurcated inner juncture 57. The perimeter 58 of the first part 51 extends into the bifurcated juncture and is secured therein by adhesive or other conventional means. This interconnection holds parts 51 and 52 together. Deck 53 is molded so that it is lower than perimeter 58 to bring inner surface 59 of the deck closer to the surface 60 of the cover plate. Adhesive patches 61 and 62 are located as in the other embodiments on the inner surface of the deck. The rim deflects under finger pressure to allow the adhesive patches to come into contact with the outer surface of the cover plate to attach the shield to the cover plate.

Patches made of the non-elastic, pliable material described above may be applied to the inner surface of the deck. In all instances, the patches may be a self-stick adhesive. Appropriately sized and shaped pieces of double-sided adhesively backed tape may also be used instead of the applied patches including double adhesively backed tape. An example of such a tape comprises a strip of smooth surfaced elastomeric foam coated on each surface with self-stick adhesive. The strip may also be non-elastic and pliable with adhesive on both sides.

Also, in each embodiment of the invention, one or more additional features may be incorporated for facilitating removal of the shields. As shown in FIG. 5, a perforation or zone of weakness 63 can be formed in the shape of a tab 64 on the end or sidewall of the raised portion 54. To remove the shield 66, the tab 64 is separated at the perforation 63 by finger pressure and deflected inwardly to provide finger access for a firm grip on the interior of the raised portion of the shield. Another alternative is a tape 60 shown in dashed lines having ends 67 and 68 adhered to the sides 70 and 71 or ends 72 and 73 of the raised portion 54 to provide a bail which provides a firm grip on the shield.

Figure 7:
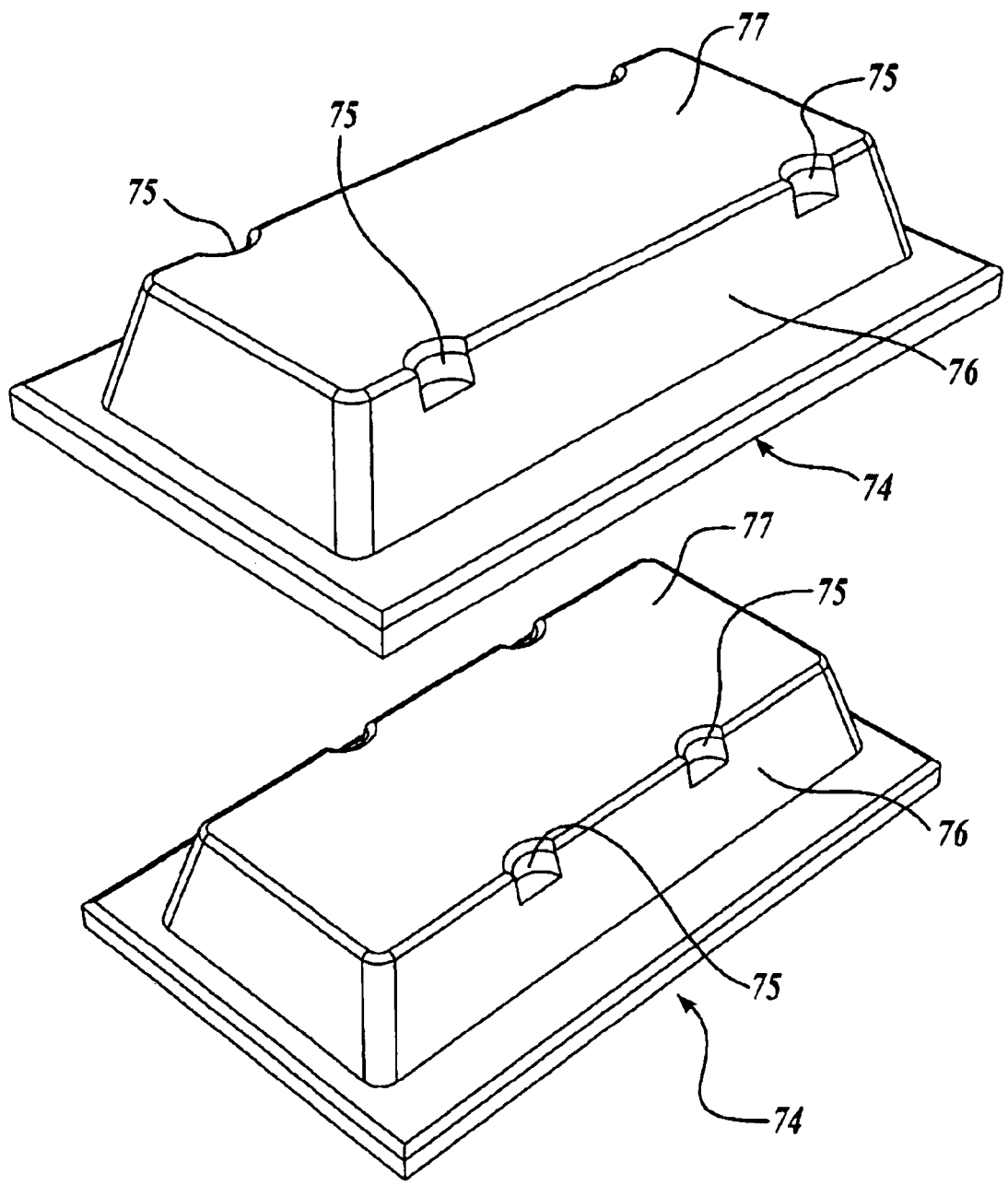
FIG. 7 is an exploded isometric view of two shields constructed in accordance with the first embodiment with denesting lugs.
Figure 8:
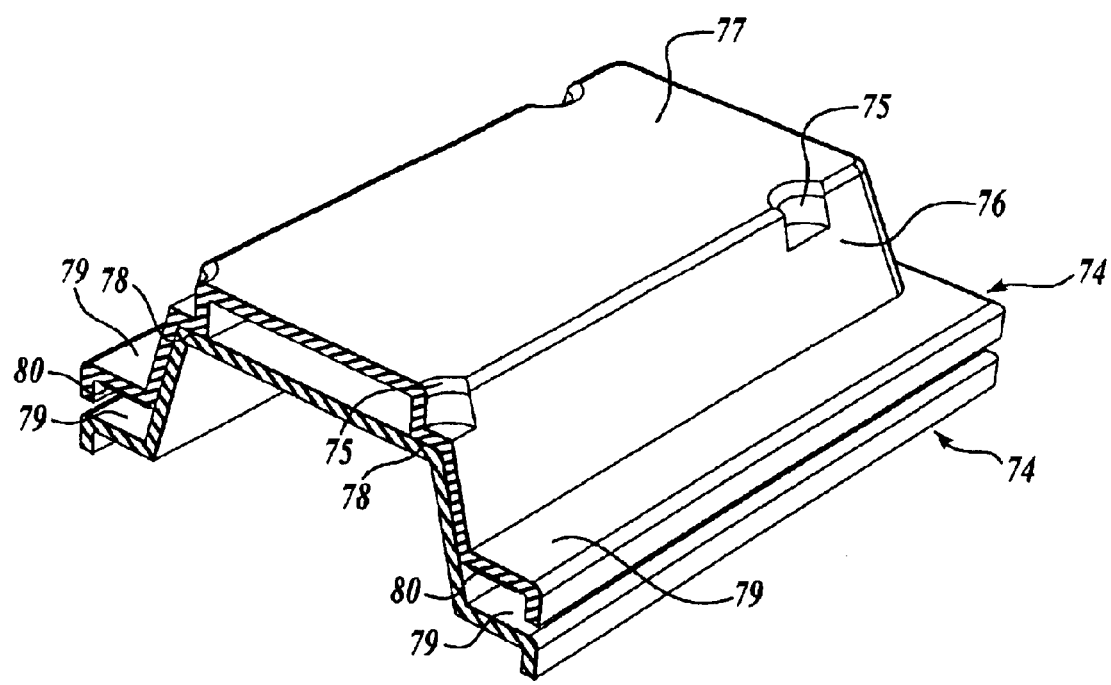
FIG. 8 is an isometric view showing nested shields with denesting lugs.

Referring now to FIG. 7 and FIG. 8, another embodiment of the shield 74 incorporates denesting lugs 75 on the raised portion 76 that covers the switch and/or outlet. All the embodiments are shaped so that they are readily stackable for conservation of packaging, mailing and storing costs. The denesting lugs are molded onto the juncture between the sides of the raised portion 76 and the top surface 77 of the raised portion. The lugs extend inwardly and downwardly and have a lower shoulder 78. The denesting lugs of successively stacked shields are offset from the lugs on adjacent shields to prevent the lugs from nesting with each other. When successive shields are stacked or nested, the shoulder 78 engages the upper surface of the raised portion on the next successively lower shield. This keeps the upper surfaces of the raised portions separated, and thus the deck portions 79. The deck portions are spaced sufficiently so that the adhesive 80 on the bottoms of the decks will not contact and adhere to the upper surface of the deck on the next successively lower shield in the stack.

While the preferred embodiment of the invention has been illustrated and described, it will be appreciated that various changes can be made therein without departing from the spirit and scope of the invention. For example, it is understood that the shields can be made in a variety of sizes and shapes to suit all standardized cover plates, whether single switch, multiple switch or multiple outlets.

The embodiments of the invention in which an exclusive property or privilege is claimed are defined as follows:

1. A paint shield for an electrical cover plate, said cover plate having an outside edge and an outwardly facing surface, said shield comprising:

a deck portion for positioning over the outwardly facing surface of said cover plate, a perimeter portion affixed to said deck portion for engaging a wall adjacent the edge of said cover plate, said perimeter portion surrounding and overlying the outside edge of the cover plate, the edge of the perimeter portion engaging said wall, and a releasable adhesive applied only to the inner portion of the deck on or adjacent the perimeter portion for releasably attaching the shield to the cover plate.

2. The shield of claim 1, further comprising:

a raised portion formed in the central portion of said deck, said raised portion for extending over and shielding a switch or outlet extending from said cover plate.

3. The shield of claim 2, wherein said adhesive is an adhesive layer.

4. The shield of claim 2, wherein said adhesive is a double-sided adhesive tape.

5. The shield of claim 1, wherein said deck and said perimeter are integral.

6. The shield of claim 2, wherein said deck, perimeter, and raised portion are integral.

7. The shield of claim 1, wherein said perimeter and said deck are separate units.

8. The shield of claim 1, wherein said raised portion has a separable finger tab thereon.

9. The shield of claim 1, wherein said shield has a handle member fastened thereto to aid in removing said shield from said cover plate.

10. The shield of claim 8, wherein said handle is integral with said shield.

11. The shield of claim 8, wherein said handle comprises a flexible tape adhered to said raised portion.

12. A paint shield for a cover plate, said cover plate having an outer edge and an outwardly facing surface, said shield comprising:

a deck portion for positioning over said cover plate, a perimeter portion affixed to said deck for engaging a wail adjacent the edge of said cover plate, said deck portion having an aperture therein located over the outwardly facing surface on said cover plate, and a flexible member having an adhesive side, said flexible member having its adhesive side applied to both the exterior of said deck and said cover plate through said aperture for fastening said shield to said cover plate.

13. The shield of claim 12, wherein said flexible member is sized slightly larger than said aperture, said flexible member covering a periphery of said aperture on the outer surface of said deck, said portion of said flexible member interior of said aperture having exposed adhesive thereon for contacting the outwardly facing surface of said cover plate.

14. The shield of claim 1, wherein said adhesive is applied to the perimeter portion and adjacent the perimeter portion.

* * * * *

UNITED STATES PATENT AND TRADEMARK OFFICE
CERTIFICATE OF CORRECTION

PATENT NO. : 6,803,522 B2 Page 1 of 1
APPLICATION NO. : 10/260372
DATED : October 12, 2004
INVENTOR(S) : M. Skakun It is certified that error appears in the above-identified patent and that said Letters Patent is hereby corrected as shown below:

| COLUMN | LINE | ERROR |
|---|---|---|
| Pg. 1, col. 2 | Assistant Examiner | "Anton B Harris" should read --Anton B. Harris-- |
| 6 (Claim 12, | 12 line 6) | "wail" should read --wall-- |

Signed and Sealed this

Third Day of April, 2007

JON W. DUDAS
*Director of the United States Patent and Trademark Office*